Patented Dec. 9, 1930

1,784,740

UNITED STATES PATENT OFFICE

GUSTAVE S. MATHEY, OF ELIZABETH, NEW JERSEY, ASSIGNOR TO JOHNSON & JOHNSON, OF NEW BRUNSWICK, NEW JERSEY, A CORPORATION OF NEW JERSEY

ADHESIVE

No Drawing.   Application filed June 3, 1927.   Serial No. 196,404.

My invention resides in certain improvements in methods for preparing rubber latex for use as an adhesive primarily intended for attaching surgical dressings, pads, bandages, and the like.

This use of latex has heretofore been proposed, but the methods of conversion proposed indifferent results in that the product was insufficiently refined, was not stable over long periods of time, and lacked uniformity of the essential thick consistency to enable it to be applied in a simple way.

By my invention, the raw material of commerce is washed, concentrated, purified, made germicidal, given a pleasant odor, thickened, and otherwise made stable for practical periods of time.

In the practice of my invention, rubber latex of commerce is subjected to an initial treatment to remove the serum and impurities and replace them with water. This may be accomplished by diluting the latex with a weak solution of a gum. Gum tragacanth, because of its uniformity, is well adapted to this purpose, but is not alone in this respect, desired results having been obtained with Irish moss, agar, Indian gum, and similar substances. The quantity of gum necessary to effect the separation of serum from the latex may vary within wide limits. For example, 200 cc. of a 1% tragacanth solution, when added to 2000 cc. of latex, and shaken, will nicely separate the latex into two layers, the upper one being a concentrated emulsion of rubber while the lower layer will be serum practically free from rubber. Yet one-tenth this quantity of tragacanth will produce good results, or the quantity may be increased several hundred per cent and still produce the separation. However, when everything is considered, the amount specified is preferred.

If the raw material contained about 35% of rubber, as is usual, the upper layer, after separation, will have a volume of about 1100 cc. and will contain about 60% of rubber. The serum is drawn off and discarded and the concentrated rubber emulsion is subjected to the next essential step of treatment.

For this step, a solution is prepared containing 3000 cc. of water, 100 cc. of sodium silicate solution containing about 30% of sodium silicate and 100 cc. of 40% formaldehyde. To this solution there is added 1000 cc. of the concentrated emulsion, and the mixture well shaken. Then 400 cc. of a 1% gum tragacanth solution is added and the whole well shaken. After standing for about 24 hours, a separation occurs with the result that the concentrated emulsion is again on top, having a volume of about 1000 cc. The remainder of the solution containing some serum together with the other ingredients added, constitutes the lower layer and is drawn off and discarded. In this step of treatment as in the first, it is not essential to the process that the proportions or quantities specified be strictly adhered to for practice has demonstrated that they may vary widely, even to the extent of several hundred per cent in either direction, and still produce good results. Nor is it necessary to confine the process solely to the use of sodium silicate. For example, sodium phosphate, sodium hydroxide, sodium carbonate, or most compounds giving an alkaline reaction can be used. So also many germicides other than formaldehyde may be employed such as, for example, thymol, phenol, cresol and others compatible with alkali.

The concentrated rubber emulsion is now a syrupy liquid containing about 38% of water, with small quantities of sodium silicate and formaldehyde and some gum tragacanth. In this condition it is raised in temperature to about 70° C., whereupon 100 cc. of a solution (also raised to 70° C.) containing 5% of agar, 1% sodium silicate, and water is added, while stirring. Perfume is now added and stirred in. The emulsion remains liquid while hot, but with cooling solidifies to a jelly-like mass. In the latter state it is squeezed through a close-woven fabric, for example, fine mesh gauze which reduces the mass to a pasty consistency and so conditions it that it will not jell again. It is now a finished adhesive and ready for bottling or other storing.

Having described my invention, I claim:
The method of treating rubber latex for use as an adhesive, which consists in subjecting refined latex emulsion to repeated concentration effort in the presence of an agent giving an alkaline reaction, adding a germicidal agent, heating the stock in the presence of preservatives and then cooling it to reduce it to a jelly-like mass, and straining the cold mass to liquefy it so that it will not jell again.

In testimony whereof I affix my signature.

GUSTAVE S. MATHEY.